United States Patent [19]

Grieger et al.

[11] 3,881,515

[45] May 6, 1975

[54] THREE-WAY VALVE

[75] Inventors: Gerhard Grieger; Joaquin Bohrdt, both of Berlin, Germany

[73] Assignee: Siemens Aktiengesellschaft, Munich, Germany

[22] Filed: July 2, 1973

[21] Appl. No.: 375,744

[30] Foreign Application Priority Data

July 14, 1972 Germany............................ 2235515

[52] U.S. Cl............................... 137/625.66; 251/84
[51] Int. Cl........................................... F15b 13/042
[58] Field of Search..... 137/596.18, 625.26, 625.66, 137/625.27; 251/63.4, 84, 86, 87

[56] References Cited
UNITED STATES PATENTS

| | | | |
|---|---|---|---|
| 1,623,431 | 4/1927 | McVoy............................. | 251/63.4 |
| 3,559,686 | 2/1971 | Hoffman..................... | 137/625.26 X |
| 3,608,587 | 9/1971 | Zbell................................ | 251/84 X |
| 3,623,694 | 11/1971 | Goldberg......................... | 251/63.4 |
| 3,625,246 | 12/1971 | Reaves....................... | 137/625.66 X |

*Primary Examiner*—Alan Cohan
*Assistant Examiner*—Gerald A. Michalsky
*Attorney, Agent, or Firm*—Kenyon & Kenyon Reilly Carr & Chapin

[57] ABSTRACT

A three-way valve suitable for reversing a fluid actuating device such as the kind used for actuating an electrical switching apparatus includes a cylinder defining inlet and outlet passages as well as a space between these passages which is connectable with the actuating device. A drive piston is movable in the cylinder between respective end positions. The piston is configured as a differential piston and has one end-face portion facing the space intermediate the inlet and outlet passages; this end-face portion of the piston is configured as a valve body corresponding to one of the passages. A second valve body is provided and corresponds to the other passage. The second valve body is mounted on a valve rod which extends through the intermediate space and into the differential piston for coupling the valve bodies together. The differential piston engages the valve rod to hold the same so as to facilitate the movement of the rod within defined limits relative to the piston whereby a firm seating of the valve bodies on valve seats corresponding to respective ones of the valve passages is assured.

4 Claims, 1 Drawing Figure

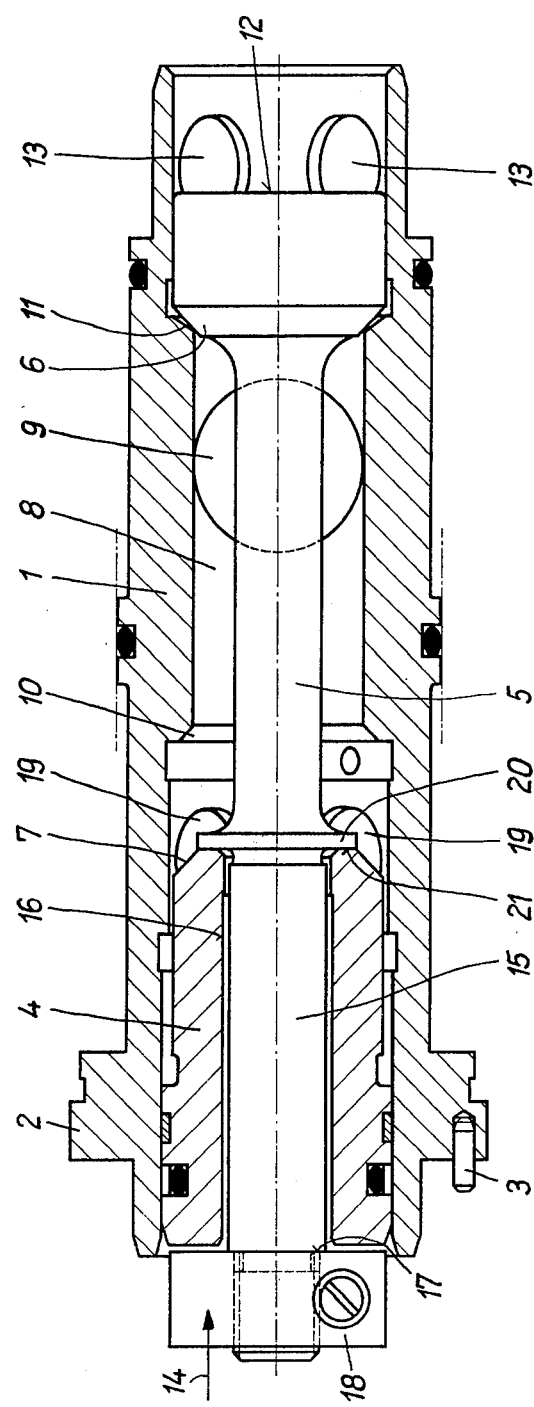

THREE-WAY VALVE

BACKGROUND OF THE INVENTION

Fluid actuating devices of electric circuit breakers, particularly electric high-voltage power circuit breakers, include an actuator having a piston and a cylinder. The actuator opens or closes the movable contacts of the circuit breaker in dependence upon opening and closing commands. Three-way valves can be used as reversing valves to control this fluid actuator.

A fluid actuator controllable by a three-way valve is disclosed, for example, in the copending application of Gerhard Grieger and Joaquin Bohrdt having Ser. No. 375,746, filed on July 2, 1973, and entitled: Fluid actuating Device for an Electric Circuit Breaker.

The invention relates to a three-way valve, and in particular, a reversing valve for a fluid actuating device of an electric circuit breaker. The three-way includes a cylinder, a drive piston and valve bodies connected therewith. The valve bodies are coupled with each other by means of a valve rod traversing the outlet space of the valve.

A particularly advantageous control of the fluid actuator of the breaker is obtained if the outlet space of the valve is connected with the drive cylinder and is alternately exposed to, and relieved of, pressure by means of the valve bodies constructed respectively as the inlet and the outlet valves. Such a control is of interest particularly if the drive piston for the fluid actuator of the breaker is configured as a differential piston and is acted upon continuously by the pressure of the pressure fluid on its small-area end-face and if the pressure fluid is selectively applied to its large-area end-face. Thus, a simple reversing of the fluid actuator of the breaker is accomplished by means of the three-way valve of the type indicated above. However, the manufacture of such a three-way valve is difficult because the valve bodies coupled with each other by the valve rod must accurately fit the corresponding valve seats. A slight off-centering of the valve seat leads to undesirable leaks between the valve bodies and the valve seats and this can impair the unequivocal control of the fluid actuator of the breaker.

SUMMARY OF THE INVENTION

It is an object of the invention to provide a three-way valve of the above-mentioned type which overcomes the foregoing disadvantages.

It is another object of the invention to provide a three-way valve wherein the valve bodies thereof shut tightly even if the corresponding valve seats are considerably off-center. Subsidiary to this object, it is an object of the invention to provide such a three-way valve without increasing manufacturing costs.

According to the invention, the foregoing objects are achieved by configuring the drive piston of the three-way valve as a differential piston. The end-face of this piston facing the outlet space of the valve is constructed as one of the valve bodies. And further, the valve rod carrying the other valve body is guided in the differential piston so that it can wobble therein.

Configuring the drive piston of the three-way valve as a differential piston affords the possibility to arrange the rod so as to engage directly at the drive piston so that piston surface areas of different size result on which the pressure can act. This differential piston forms one of the valve bodies, while the other valve body is mounted on the valve rod which is arranged in the differential piston so that it can wobble with respect thereto.

The three-way valve of the invention is suitable for reversing a fluid actuating device such as the kind used for actuating an electrical switching apparatus. The three-way valve includes as a feature a cylinder defining a valve-inlet passage, a valve-outlet passage and a space between the passages connectable with the fluid actuating device. The cylinder further defines valve seats at the passages respectively. A drive piston is movable in the cylinder between first and second end-positions. This piston is a differential piston and has an end-face portion facing the space between the passages. The end-face portion is configured as a valve-body corresponding to one of the passages. A second valve body corresponds to the other one of the passages. A valve rod carries the second valve body and extends through the above-mentioned space and into the differential piston for coupling the valve bodies together. The differential piston engages the valve rod to hold the same so as to facilitate movement thereof within defined limits relative to the piston whereby a firm seating of the valve bodies on corresponding ones of the valve seats is assured.

With this arrangement of the valve rod, manufacturing inaccuracies occurring in the fabrication of the valve seats are largely compensated. In a preferred embodiment of the three-way valve according to the invention, the valve rod extends through a longitudinal cavity in the differential piston with radial play. In this manner, thhe piston can center itself in the corresponding valve seat within the play, which is in any event required, between the surface of the piston and the cylinder bore, while the valve body connected with the valve rod also can center itself in a self-acting manner in a somewhat off-centered valve seat bore because of the radial play of the valve rod.

In addition, in order to facilitate the wobble motion of the valve rod, it is advantageous to support the valve rod in the differential piston with axial play.

The invention makes it possible to produce a three-way valve by simple means. No increased requirements are imposed on the accuracy of centering of the valve seats because the valve bodies are self-centering due to the wobble-like support of the valve rod and, thus, the valve seats are thereby sealed to a sufficient degree.

Although the invention is illustrated and described herein as THREE-WAY VALVE, it is nevertheless not intended to be limited to the details shown, since various modifications may be made therein within the scope and the range of the claims. The invention, however, together with additional objects and advantages will be best understood from the following description and in connection with the accompanying drawing.

BRIEF DESCRIPTION OF THE DRAWING

The drawing illustrates, partially in section, a three-way valve according to a preferred embodiment of the invention. The illustrated embodiment is suitable particularly as a reversing valve for fluid actuating devices of electric high-voltage power circuit breakers.

DESCRIPTION OF THE PREFERRED EMBODIMENTS OF THE INVENTION

The three-way valve includes a cylinder 1 which is insertable into a bore of a control housing (not shown).

The cylinder 1 can be secured in this control housing with its flanged rim 2 and inserted pin 3.

A drive piston 4 is movably guided in the cylinder 1 and is configured as a differential piston. A rod 5 carries a valve body 6 on one end thereof and is coupled with the drive piston 4. A second valve body required for reversing the three-way valve is formed by the surface portion 7 of the differential piston 4. The valve rod 5 extends through a bore 8 which is provided as the outlet space of the valve and which is connectable through an opening 9 with, for example, the actuator of the breaker. The bore 8 is bounded at both longitudinal ends by valve seats 10 and 11.

In the illustrated embodiment, the valve body 6 forms the inlet valve and the surface portion 7 of the differential piston 4 the outlet valve, provided that the end-face 12 of the valve body 6 can be subjected continuously to the pressure of the pressure fluid through the bores 13. If pressure is applied to the differential piston 4 in the direction of the arrow 14, the differential piston assumes a position in which the surface portion 7 is pressed against the valve seat 10 and the valve body 6 is lifted from the valve seat 11, and the pressure fluid supplied through the openings 13 is fed to the valve outlet space 8 and thereby, to the opening 9.

If the valve seats 10 and 11 are slightly off-center relative to the valve bodies 6 and 7, no leaks result because of the wobble-like support provided in the differential piston 4 for the valve rod 5.

For establishing the wobble-like support, the valve rod 5 is provided with an extension 15 which extends through a longitudinal cavity 16 of the differential piston 4 with radial play. The length of the extension 15 is made such that a fastening element 18 mounted on its free end 17 affords axial play between the valve rod 5 and the differential piston 4. By means of this support with axial play, additional wobbling motion of the valve rod is possible without the need to make the contacting surfaces between the valve rod 5 and the differential piston 4 spherical.

For reversing the three-way valve, the differential piston 4 is relieved of pressure fluid and is thereby moved in the direction opposite to the arrow 14. The valve outlet space 8 is thereby closed off by the valve body 6 and the valve seat 10 is vacated. Thus, the outlet bores 19 of the three-way valve are connected with the outlet space 8 and opening 9.

The valve rod 5 has a collar 20 which is pressed tight against the end-face 21 of the piston 4 when pressure is applied in the direction of the arrow 14. Leakage losses through the longitudinal cavity 16 are thereby prevented. The collar 20 serves mainly as an engaging portion for the valve rod 5 to move the same when pressure force is applied in the direction of arrow 14.

What is claimed is:

1. A three-way valve for reversing a fluid actuating device such as the kind used for actuating an electrical switching apparatus or the like comprising: a cylinder defining a valve-inlet passage, a valve-outlet passage and a space between said passages, said cylinder having an opening formed therein for connecting said space to the fluid actuating device; said cylinder further defining valve seats at said passages respectively; a single drive piston movable in said cylinder between first and second end positions, said piston being a differential piston and having an end-face portion facing said space, said end-face portion being configured as a valve-body corresponding to one of said passages; a second valve body corresponding to the other one of said passages; and, a valve rod carrying said second valve body and extending through said space and into said differential piston for coupling said valve bodies together to coact to cause said other passage to open when said one passage is closed and conversely, to cause said one passage to open when said other passage is closed, said differential piston engaging said valve rod to hold the same in wobble-like fashion so as to facilitate the movement thereof within defined limits relative to said piston whereby a firm seating of said valve bodies on corresponding ones of said valve seats is assured.

2. The three-way valve of claim 1, said differential piston defining a longitudinal cavity for accommodating said valve rod therein, said cavity being dimensioned to facilitate the radial movement of said rod therein within predetermined limits.

3. The three-way valve of claim 2, said valve rod being equipped with means for facilitating the axial movement of the same in said differential piston within predetermined limits.

4. The three-way valve of claim 3 wherein said valve rod extends through said piston to penetrate the far end-face thereof opposite said first-mentioned end-face, said means for facilitating the axial movement of said rod comprising a fastening element mounted on the penetrating portion of said rod for facilitating the axial movement of said rod relative to said piston within predetermined limits.

* * * * *